United States Patent [19]

Takahashi et al.

[11] Patent Number: 4,684,928
[45] Date of Patent: Aug. 4, 1987

[54] MOTION SENSOR UNIT

[75] Inventors: Toshiaki Takahashi; Tokio Suzuki, both of Iwaki, Japan

[73] Assignee: Alpine Electronics Inc., Japan

[21] Appl. No.: 804,157

[22] Filed: Dec. 3, 1985

[30] Foreign Application Priority Data

Dec. 3, 1984 [JP] Japan .................. 59-255287
Dec. 3, 1984 [JP] Japan .................. 59-255288

[51] Int. Cl.⁴ .............. G08B 19/00; H01H 35/02
[52] U.S. Cl. .................. 340/521; 340/52 H;
340/61; 340/665; 340/671; 340/683; 340/686;
340/689; 340/65; 200/61.45 R; 200/61.52;
200/52 A
[58] Field of Search ........... 340/52 H, 61, 63, 665,
340/671, 65, 683, 686, 689, 521; 200/61.45 R,
61.52, 52 A

[56] References Cited

U.S. PATENT DOCUMENTS

| | | | |
|---|---|---|---|
| 3,455,149 | 7/1969 | Foster et al. | 340/683 |
| 3,930,248 | 12/1975 | Keller | 340/683 |
| 3,979,739 | 9/1976 | Birchall | 340/683 |
| 4,253,095 | 2/1981 | Schwarz et al. | 340/689 |
| 4,359,717 | 11/1982 | Huber et al. | 340/683 |
| 4,378,693 | 4/1983 | Ratcliffe | 340/689 |
| 4,414,541 | 11/1983 | Ho | 340/689 |

Primary Examiner—Donnie L. Crosland
Attorney, Agent, or Firm—Guy W. Shoup

[57] ABSTRACT

A motion sensor unit which includes a sensor assembly for monitoring whether or not the inclination of a mobile member is in excess of a predetermined reference angle and outputting a pulse signal in case the inclination is greater than the reference angle; a detector for monitoring whether or not the duration of the pulse signal is in excess of a predetermined reference time and, in the case of any excess, outputting a signal representing that the inclination of the mobile member is greater than the reference angle and is continuous for more than the reference time; a sensor assembly for outputting a pulse signal inverted in accordance with the value of a shock given to the mobile member; and a detector for monitoring whether or not the cycle of the pulse signal is shorter than a predetermined reference time and outputting a shock detection signal when the cycle is shorter than the reference time. Due to the above constitution, the motion sensor unit is capable of controlling the shock detection sensitivity continuously and independently without altering the detection sensitivity for any jolt or inclination.

5 Claims, 17 Drawing Figures

MOTION SENSOR UNIT

BACKGROUND OF THE INVENTION

1. Field of the Invention

The present invention relates to a motion sensor unit and, more particularly, to a type capable of sensing a successive inclination of a mobile member such as a vehicle body continued for more than a predetermined reference time at any angle greater than a predetermined reference value and producing a detection output representative of the sensed inclination.

Furthermore, the invention relates also to a motion sensor unit capable of sensing any shock given to a mobile member such as a vehicle body at a level greater than a predetermined reference value and producing a detection output representative of the sensed shock.

2. Description of the Prior Art

There is known a motion sensor unit of the type that detects the value of an inclination or jolt of a mobile member such as a vehicle body and, upon increase of the detected value beyond a predetermined level, outputs a switching signal to indicate the excess. Such unit is convenient and effective in the use for preventing theft of a vehicle or the like.

FIGS. 12(A)–(C) and 13(A)–(C) illustrate the structures of conventional motor sensor units known heretofore, wherein a sealed receptacle 12 is housed in a casing 11, and mercury 13 is contained in the receptacle. A pair of electrodes 11a and 11b are attached to the casing 11 and are connected either directly or through a resistor R to a battery BT. The receptacle 12 comprises a tray 12a of a conductive material, a cover 12b composed similarly of a conductive material, and an insulator 12c for electrically isolating the tray and the cover from each other, in which the tray 12a and the cover 12b are connected electrically to the electrodes 11b and 11a respectively via leadwires 14. When a high sensitivity is particularly required in sensing the inclination or shock of a mobile member, the inclination angle $\theta$ of the insulator 12c is decreased ($\theta = \theta_H$) as shown in FIG. 13(A). Meanwhile, when it is desired to reduce the sensitivity, the inclination angle $\theta$ of the insulator 12c is increased ($\theta = \theta_L > \theta_H$) as shown in FIG. 13(A).

In case the motion sensor unit is in a horizontal posture, the mercury 13 is existent on the tray 12a as shown in FIGS. 12(A) and 13(A), whereby no closed electric circuit is formed. However, if the motion sensor unit is so inclined that its angle $\theta$ exceeds either $\theta_H$ or $\theta_L$, then the mercury 13 is displaced onto the insulator 12c as shown in FIG. 12(B) or 13(B), thereby forming a closed electric circuit. Accordingly, monitoring the formation of such a closed electric circuit renders it possible to discriminate whether or not the inclination angle of the motion sensor unit has exceeded a predetermined value.

In case any shock given to the motion sensor unit becomes greater than a predetermined value, i.e. when the acceleration $\alpha$ is in excess of $\alpha_H$ [FIG. 12(B)] or $\alpha_L$ ($>\alpha_H$) [FIG. 13(B)], then the mercury 13 is displaced onto the insulator 12c to form a closed electric circuit.

In any of the conventional motion sensor units, adjustment of the sensitivity with respect to a shock, jolt or inclination is executed by varying the inclination angle $\theta$ of the insulator. However, it is impossible therein to attain continuous adjustment of the sensitivity by such technique, and there exists another disadvantage that an individually independent adjustment is not achievable relative to the sensitivity for a shock and that for an inclination or jolt.

SUMMARY OF THE INVENTION

It is an object of the present invention to provide an improved motion sensor unit capable of adjusting the detection sensitivity continuously as well as executing an individual adjustment of the sensitivity for an inclination and that for a jolt independently of each other.

Another object of the invention resides in providing an improved motion sensor unit which is adapted to adjust the detection sensitivity for a shock without causing any harmful influence on that for an inclination or jolt and still is capable of carrying out continuous sensitivity adjustment.

According to one aspect of the present invention, there is provided a motion sensor unit comprising a sensor assembly for monitoring whether or not the inclination of a mobile member is in excess of a predetermined reference angle and outputting a pulse signal in response to any excess of the inclination beyond the reference angle; and a detector for monitoring whether or not the duration of the pulse signal is in excess of a predetermined reference time and, in response to any excess thereof beyond the reference time, outputting a signal representing that the inclination of the mobile member is greater than the reference angle and is continuous for more than the reference time.

According to another aspect of the present invention, there is provided a motion sensor unit comprising a sensor assembly for outputting a pulse signal inverted in response to a shock given to the mobile member; and a detector for monitoring whether or not the cycle of the pulse signal is shorter than a predetermined reference time and outputting a shock detection signal in case the cycle is shorter than the reference time.

DETAILED DESCRIPTION OF THE PREFERRED EMBODIMENTS

Figure 1:
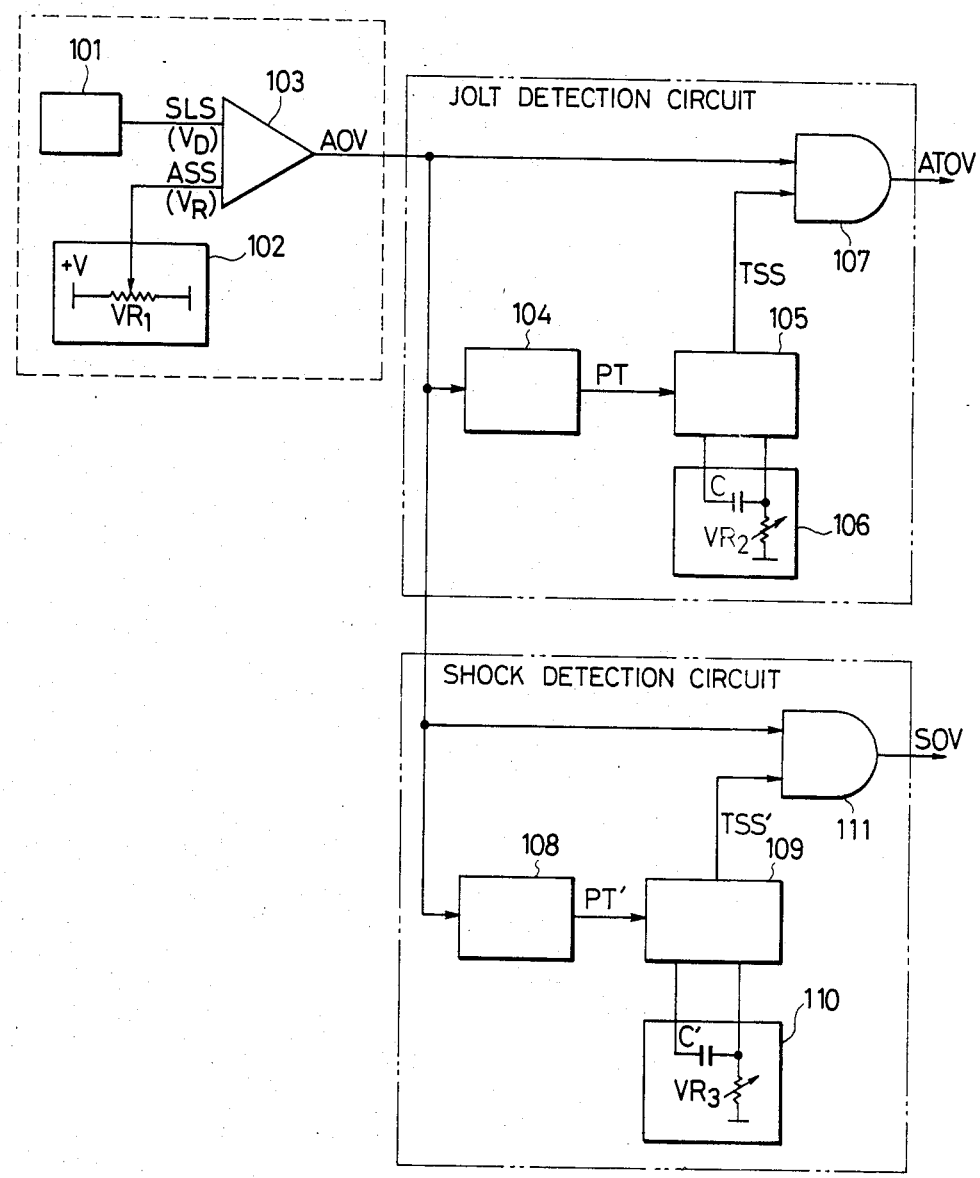
FIG. 1 is a block diagram of an exemplary embodiment of the present invention.

The motion sensor unit of this invention comprises a sensor assembly for monitoring whether or not the inclination of a mobile member (e.g. vehicle body) is in excess of a predetermined reference angle and outputting a pulse signal in response to any excess of the inclination beyond the reference angle; a detector for monitoring whether or not the duration of the pulse signal is in excess of a predetermined reference time and, in response to any excess thereof beyond the reference time, outputting a signal representing that the inclination of the mobile member is greater than the reference angle and is continuous for more than the reference time; and an adjuster for adjusting the duration of the aforesaid predetermined reference time.

Another motion sensor unit of the invention comprises a sensor assembly attached to a mobile member such as a vehicle body and producing an output signal corresponding to a shock given to the mobile member; a comparator for comparing the output signal of the sensor assembly with a predetermined reference level and outputting a pulse signal inverted in accordance with the result of such comparison; a detector for monitoring whether or not the cycle of the pulse signal is shorter than a predetermined reference time and outputting a shock detection signal in case the cycle is shorter than the reference time; and an adjuster for adjusting the duration of the aforesaid predetermined reference time.

The voltage $V_D$ outputted from the sensor attached to the vehicle body is compared with a preset voltage $V_R$. The output voltage $V_D$ of the sensor represents a value corresponding to the inclination or jolt of the vehicle body and varies in such a manner as to become greater in accordance with decrease of the inclination. The preset voltage $V_R$ has a value representing a predetermined reference inclination or jolt. Accordingly, if the result of such comparison is $V_D > V_R$, the inclination or jolt of the vehicle body is recognized to be smaller than the predetermined reference angle. Meanwhile, in the case of $V_D \leq V_R$, the inclination or jolt is recognized to be greater than the reference angle. However, such recognition alone is not sufficient to discriminate whether or not the vehicle body inclination of any angle above the reference value is maintained continuously for more than a predetermined reference time. In order to achieve such discrimination, the circuit configuration is so contrived as to ascertain if the time kept under the condition of $V_D \leq V_R$ is continuous for more than a predetermined reference time $T_R$, which is rendered adjustable in the invention.

Due to the contrivance mentioned above, detection of whether or not the continuous vehicle inclination is in excess of the predetermined reference angle is attainable by presetting the aforesaid reference time $T_R$ at a greater value, and detection of whether or not the vehicle jolt of a short cycle is in excess of the predetermined reference angle is also attainable by presetting the reference time $T_R$ at a smaller value.

The time kept under the condition of $V_D \leq V_R$ becomes longer in the case of a greater jolt. Therefore, the value of any jolt to be detected is variable by adjusting the aforesaid reference time $T_R$: i.e. the jolt detection sensitivity is adjustable by such technique.

An output signal equivalent to the shock given is produced from the sensor attached to the vehicle body. The comparator serves to compare the output signal of the sensor with a level corresponding to a predetermined reference inclination angle and outputs a pulse signal whose logical level is inverted in accordance with the result of such comparison. The detector monitors whether or not the cycle of the pulse signal is shorter than a predetermined reference time and outputs a shock detection signal in case the cycle is shorter than the reference time.

Figure 2:
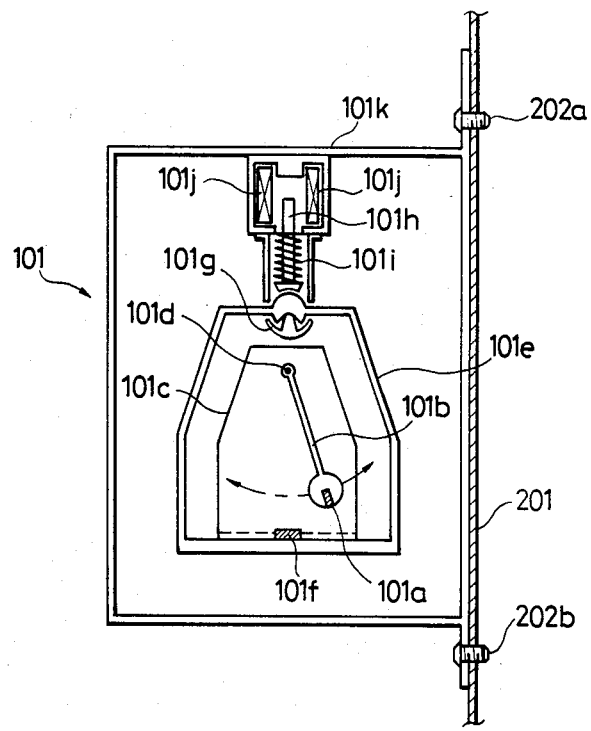
FIG. 2 shows the structure of a sensor employed in the invention.

FIG. 1 is a block diagram of the motion sensor unit according to the present invention, and FIG. 2 shows the structure of a sensor employed therein. The following description will be given with regard to an instance where the motion sensor unit is secured to a vehicle body.

In FIG. 1, a sensor 101 produces an output signal SLS having a voltage $V_D$ equivalent to the oscillation cycle and amplitude of the vehicle body in case the oscillation consists of jolts of a relatively long cycle or, when the vehicle body oscillation is caused by any shock given thereto suddenly, produces an output signal SLS whose voltage $V_D$ is varied at the cycle corresponding to the value of the shock. There are also shown an angle presetter 102 for outputting a preset signal ASS having a voltage $V_R$ equivalent to a predetermined reference inclination angle; a comparator 103 for comparing the values of $V_D$ and $V_R$ with each other and producing a pulse signal AOV inverted in accordance with the result of such comparison; a fall detector 104 for detecting the fall of the pulse signal AOV; a pulse generator 105 for outputting a pulse signal TSS of a high level for a predetermined time from the fall of the pulse signal AOV; a duration adjuster 106 for adjusting the duration of the pulse signal TSS; and an AND gate 107 for computing a logical product of the pulse signals AOV and TSS and outputting a jolt detection signal ATOV which indicates that the vehicle jolt is in excess of the predetermined reference angle.

The angle presetter 102 consists of, e.g. a variable resistor VR1; the pulse generator 105 consists of, e.g. a monostable multivibrator; and the duration adjuster 106 consists of a series circuit of a capacitor C and a variable resistor VR2 for varying the time constant of the pulse generator 105. The fall detector 104, pulse generator 105, duration adjuster 106 and AND gate 107 constitute a jolt detection circuit.

There are further shown a rise detector 108 for detecting the rise of the pulse signal AOV; a pulse generator 109 for outputting a pulse signal TSS' which is turned to a low level for a predetermined time from the rise of the pulse signal AOV; a duration adjuster 110 for adjusting the low-level time of the pulse signal TSS'; and an AND gate 111 for computing a logical product of the pulse signals AOV and TSS' and producing a shock detection signal SOV when the shock given to the vehicle body is greater than the predetermined reference value. The pulse generator 109 consists of a monostable multivibrator; and the duration adjuster 110 consists of a capacitor C' and a variable resistor VR3 for adjusting the time constant of the pulse generator 109 which corresponds to the low-level time of the pulse signal TSS'. The rise detector 108, pulse generator 109, duration adjuster 110 and AND gate 111 constitute a shock detection circuit.

As illustrated in FIG. 2, the sensor 101 comprises a pendulum 101b with a magnet 101a embedded therein, a fulcrum case 101c, a pendulum pivot 101d attached to the fulcrum case 101c, a bracket 101e, a reluctance element 101f secured to the bracket 101c immediately below the pendulum, a centering member 101g serving as a centering support point for the bracket 101e, a plunger 101h, a spring 101i for elastically urging the head of the plunger 101h to press the same against the bracket, a coil 101j for drawing the plunger 101h upward when energized, and a sensor case 101k. Further shown are a vehicle body 201, and setscrews 202a and 202b for anchoring the sensor case 101k to the vehicle body 201. A circuit for generating a signal SLS (FIG. 1) in accordance with a reluctance variation of the element 101f is omitted in the illustration.

The bracket 101e is previously positioned in center to set the sensor 101 in a standby mode. Such centering operation is performed in the following procedure. First the vehicle body is maintained at a standstill, and a current is applied to flow in the coil 101j. Upon flow of the current, the plunger 101h overcomes the elasticity of the spring 101i to move upward, thereby rendering the bracket 101e free to turn the entirety in the vertical direction around the centering member 101g which functions as a centering support point. Thus, the magnet 101a embedded in the pendulum 101b comes to be opposed to the reluctance element 101f. When the current flowing in the coil 101j is interrupted in this state, the plunger 101h is elastically urged by the spring 101i so that its head portion presses the head of the bracket 101e to place the sensor 101 in a standby mode.

Figure 3:
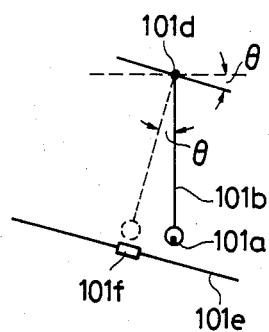
FIGS. 3 through 5 schematically illustrate the invention.
Figure 4:
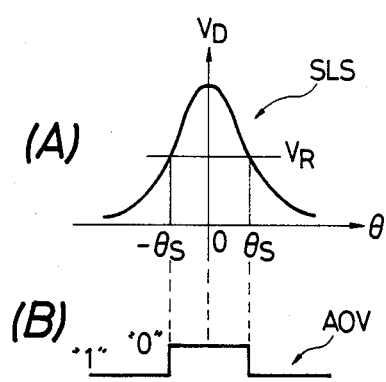

Thereafter, when an inclination or jolt of an angle $\theta$ is induced at a relatively long cycle in the vehicle body 201, the pendulum 101b is inclined or jolted at the angle $\theta$ in compliance with the inclination or jolt of the vehicle body from a dotted-line position to a solid-line position as illustrated in FIG. 3 while turning around the pendulum pivot 101d. As a result, the magnet 101a embedded in the pendulum 101b is separated from the reluctance element 101f in the case of an inclination or is repeatedly moved toward and away from the element 101f in the case of a jolt. Such movement of the pendulum 101b is detected by the reluctance element 101f, which then produces an output signal SLS of a voltage $V_D$ equivalent to the inclination or jolt of the pendulum corresponding to that of the vehicle body as graphically shown in FIG. 4(A). An unshown circuit configuration of the sensor 101 is so formed that the voltage $V_D$ of the signal SLS becomes lower in accordance with increase of the inclination angle. Consequently, in an arrangement where the reference voltage $V_R$ corresponding to a predetermined inclination angle $\theta$ is previously set by the angle presetter 102 and the two voltages $V_D$ and $V_R$ are compared with each other, it becomes possible to discriminate whether or not the actual inclination or jolt is greater than the preset angle $\theta_S$. For example, the pulse signal AOV [FIG. 4(B)] is turned to a low level in the case of $V_D \leq V_R$, denoting that the actual inclination or jolt is in excess of the preset angle.

Figure 5:
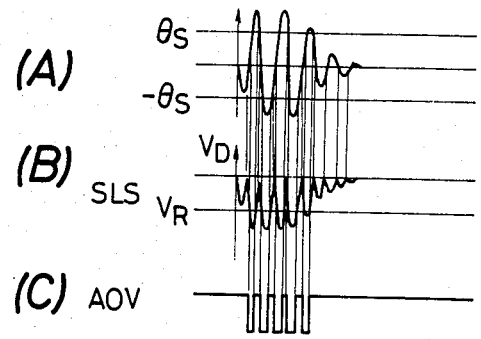
Figure 6:
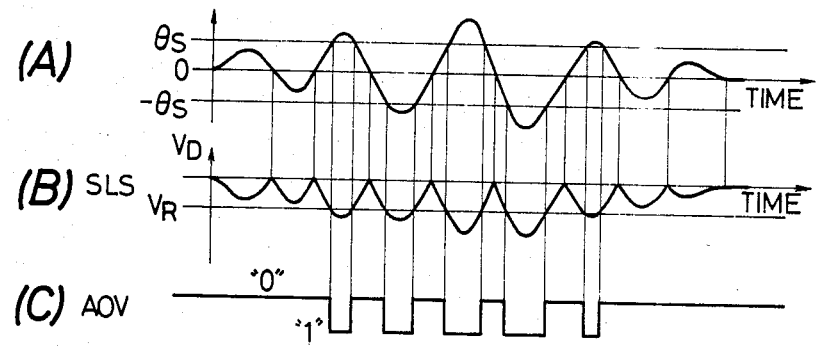
FIGS. 6 and 7 are timing charts for explaining a jolt detection mode in the invention.
Figure 7:
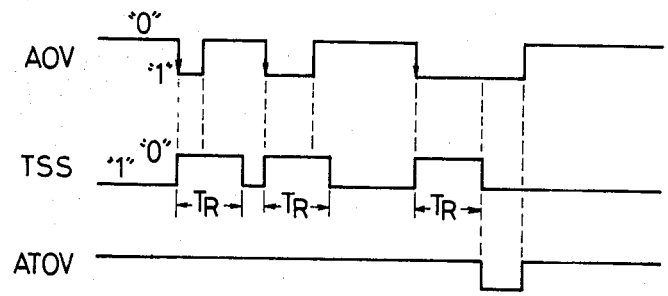

Meanwhile, in case any shock is given to the vehicle body, the pendulum 101b in the sensor 101 is incapable of complying with the sudden oscillation of the vehicle body and is thereby placed in an unbalanced state temporarily, so that the pendulum 101b comes to oscillate at the inherent frequency thereof, as shown in FIG. 5(A). As a result, the reluctance element 101f produces, as shown in FIG. 5(B), an output signal of a frequency corresponding to the oscillation frequency of the pendulum 101b. Therefore, if the inherent oscillation frequency of the pendulum 101b is selectively set at a value considerably higher than the vehicle jolt oscillation, the shock is detectable separately from the jolt by monitoring the frequency of the output signal SLS obtained from the reluctance element 101f, i.e. by monitoring the cycle of the pulse signal AOV from the comparator 103.

Now the operations for detecting a jolt and a shock will be described below with reference to FIGS. 1, 2 and the waveform charts of FIGS. 6 through 11.

A voltage $V_R$ corresponding to the inclination angle $\pm \theta_S$ of the vehicle body is applied to a first input terminal of the comparator 103 with previous adjustment of the variable resistor VR1 in the angle presetter 102. Also the variable resistor VR2 in the duration adjuster 106 is previously adjusted so that a pulse signal TSS of a predetermined reference duration $T_R$ is obtained from the pulse generator 105. Similarly, the variable resistor VR3 in the duration adjuster 110 is also adjusted previously so that a pulse signal TSS' having a low level ("1") during a predetermined reference time $T_S$ from the rise of the pulse signal AOV is produced from the pulse generator 109.

(A) Detection of inclination and jolt

When the vehicle body 201 (FIG. 1) is inclined or jolted at a relatively long cycle, the pendulum 101b is also inclined or jolted in compliance with the vehicle body inclination or jolt as shown in FIG. 6(A), whereby a signal SLS varied synchronously with the vehicle body jolt as shown in FIG. 6(B) is produced from the sensor 101 and then is fed to the second input terminal of the comparator 103.

The comparator 103 functions to compare the voltage $V_D$ of the signal SLS with the preset voltage $V_R$ and outputs a pulse signal AOV whose pulse duration varies in accordance with the result of such comparison. The pulse signal AOV [FIG. 6(C)] is turned to a high level ("0") in the case of $V_D > V_R$, or to a low level ("1") in the case of $V_D \leq V_R$.

The pulse signal AOV is fed to the fall detector 104, which then detects the fall [indicated by an arrow in FIG. 7(A)] of the pulse signal AOV and generates a trigger pulse PT to be fed to the pulse generator 105. That is, one trigger pulse PT is generated from the fall detector 104 each time the vehicle body inclination or jolt exceeds the predetermined reference inclination angle $\pm \theta_S$.

In response to the trigger pulse PT applied, the pulse generator 105 immediately generates a pulse signal TSS of a preset duration $T_R$.

The AND gate 107 provides a jolt detection signal ATOV when each of the pulse signals AOV abd TSS has a "1" level. In other words, the AND gate 107 outputs a jolt detection signal ATOV of a low level ("1") when the vehicle body inclination is greater than the reference angle $\theta_S$ and is continuous for more than the preset duration $T_R$.

Due to the procedure mentioned above, when the preset duration $T_R$ is so adjusted as to become relatively long by the duration adjuster 106, discrimination is executed to ascertain if the vehicle body inclination is in excess of $\pm \theta_S$ continuously for a relatively long time. And the detection sensitivity with regard to the relatively long continuous inclination of the vehicle body is controllable through adjustment of the angle $\theta_S$ by the angle presetter 102.

Furthermore, when the preset duration $T_R$ is so altered as to become relatively short by the duration adjuster 116, discrimination is executed to ascertain if a short-cycle jolt of the vehicle body is in excess of $\pm \theta_S$. And the jolt detection sensitivity is controllable by adjusting the preset duration $T_R$ or the preset angle $\theta_S$. In the case of a great jolt where the time relative to the condition of $V_D \leq V_R$ is long, the jolt detection sensitivity is controllable by adjusting the preset duration $T_R$ without affecting the inclination detection sensitivity. In accordance with decrease of the duration $T_R$, the jolt detection sensitivity becomes higher to detect smaller jolts.

Figure 8:
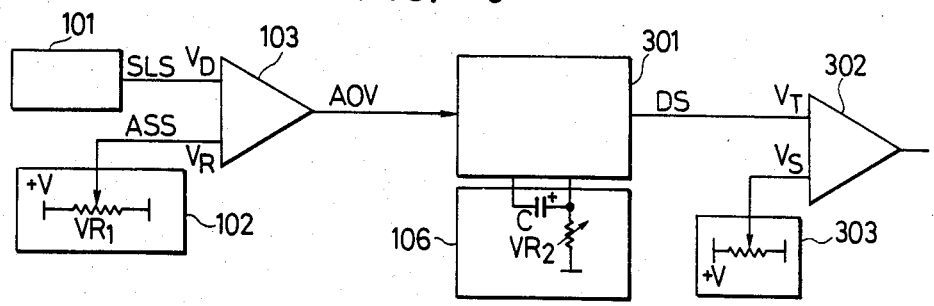
FIG. 8 is a block diagram of another exemplary embodiment of the invention.
Figure 9:
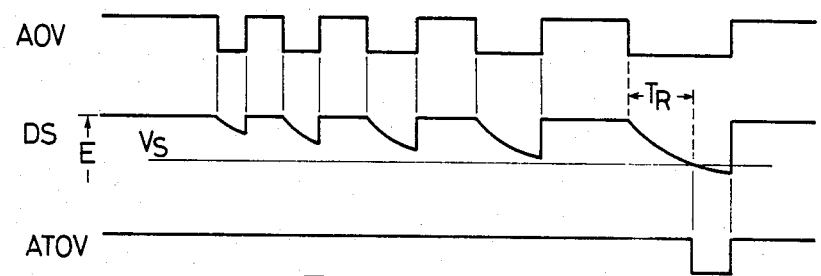
FIG. 9 is a timing chart for explaining the embodiment of FIG. 8.
Figure 10:
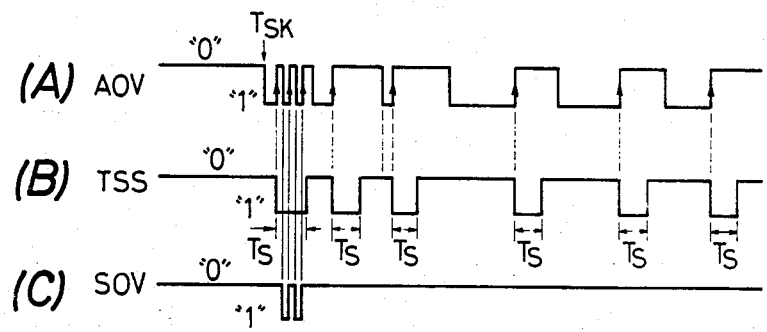
FIGS. 10 and 11 are timing charts for explaining a shock detection mode in the invention.
Figure 11:
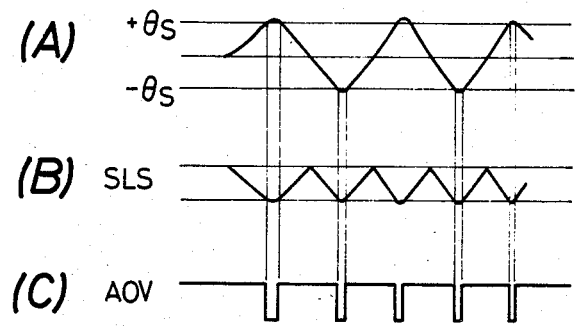

FIG. 8 is a block diagram of another exemplary embodiment of the invention, and FIG. 9 shows waveforms of signals produced therein, wherein the same reference numerals and symbols as shose used previously in FIG. 1 denote equivalents.

In FIG. 8, a pulse signal AOV turned to a low level in the case of $V_D \leq V_R$ or to a high level in the case of $V_D > V_R$ is produced from a comparator 103 similarly to the foregoing example of FIG. 1. A delay circuit 301 is so formed as to produce an output signal DS of a fixed voltage E when the pulse signal AOV has a high level ($V_D > V_R$), or to produce, when the pulse signal AOV has a low level ($V_D \leq V_R$), an output signal DS whose voltage decreases according to the time constant preset by a duration adjuster 106. A comparator 302 functions to compare the voltage $V_T$ of the output signal DS of the delay circuit 301 with the preset voltage $V_S$ established in the voltage presetter 303 and produces a low-level detection signal ATOV in the case of $V_T \leq V_S$.

When the actual inclination angle of the vehicle body is smaller than the predetermined reference angle, the pulse signal AOV has a high level so that the capacitor C in the duration adjuster 106 is charged, whereby a signal DS of a voltage E is outputted from the delay circuit 301. Consequently, in case the actual inclination angle of the vehicle body is smaller than the preset angle, the voltages compared are in the relationship of $V_T > V_S$, so that the detection signal ATOV is kept at a high level.

However, when the actual inclination angle exceeds the preset value, the charge stored in the capacitor C of the duration adjuster 106 is discharged according to a prescribed time constant so that the voltage $V_T$ of the output signal DS of the delay circuit 301 is reduced. And this voltage $V_T$ of the signal DS becomes lower in accordance with increase of the time during which the inclination angle of the vehicle body is retained in excess of the preset angle. Accordingly, if the discharge is continued for more than the preset duration $T_R$, the relationship between the compared voltages changes as $V_T \leq V_S$ so that the comparator 302 produces a low-level detection signal ATOV, which denotes that the actual inclination angle of the vehicle body is in excess of the preset angle and is continuous for more than the predetermined reference time.

In the embodiment of FIG. 8, the duration may be controlled by adjusting the variable resistor VR2 in the duration adjuster 106, or by adjusting the preset voltage $V_S$ in the voltage presetter 303.

(B) Detection of shock

When a shock is given to the vehicle body 201, the pendulum 101b of the sensor 101 oscillates at the inherent frequency thereof. As a result, the sensor 101 produces an output signal SLS having the above inherent oscillation frequency and an amplitude corresponding to the value of the shock given, whereby the comparator 103 produces a pulse signal AOV shown in FIG. 10(A). In this example, it is assumed that the shock is given to the vehicle body at a moment $T_{SK}$.

The pulse signal AOV is applied to the rise detector 108, which then detects the rise [indicated by an arrow in FIG. 10(A)] of the pulse signal AOV and produces a trigger pulse PT' to be fed to the pulse generator 109. That is, in case the pendulum 102b oscillates at the inherent frequency thereof beyond any angle greater than the predetermined value ($\theta_S$) as a result of a shock given to the vehicle body, the rise detector 108 produces a trigger pulse PT' when the oscillation shifts from a region above the angle $\theta_S$ to a region therebelow.

The pulse generator 109 functions in response to the trigger pulse PT' fed thereto and immediately generates a pulse signal TSS' which is turned to a low level ("1") during the predetermined time $T_S$. A next trigger pulse PT' is ignored if generated prior to the lapse of such time $T_S$.

The AND gate 111 provides a shock detection signal SOV when each of the input pulse signals AOV and TSS' has a low level ("1"). That is, a low-level shock detection signal SOV is provided from the AND gate 111 when the cycle of the pulse signal AOV is shorter than the predetermined reference time; namely, when the pendulum 101b of the sensor oscillates at the inherent frequency thereof with an amplitude greater than the reference value after a considerable shock is given to the vehicle body.

In the present invention, generation of a shock is recognized by checking if the period of time, which extends from the moment the amplitude of the pendulum 101b caused by the shock to once exceed the predetermined angle $\theta_S$ becomes smaller than that to the moment the pendulum amplitude exceeds the angle $\theta_S$ again, is shorter than the preset time $T_S$. Therefore, even if a small jolt as shown in FIG. 11(A) is induced to generate a short-cycle pulse signal AOV [FIG. 11(C)], the present invention is capable of recognizing such jolt with accuracy and is thereby free from malfunction.

The shock detection sensitivity is controllable by adjusting the preset time $T_S$. Accordingly, such sensitivity can be controlled independently without altering the jolt or inclination sensitivity.

Figure 12A:
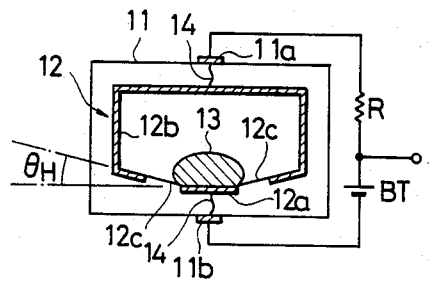
FIGS. 12(A)–(C) and 13(A)–(C) respectively illustrate conventional motion sensor units known heretofore.
Figure 13A:
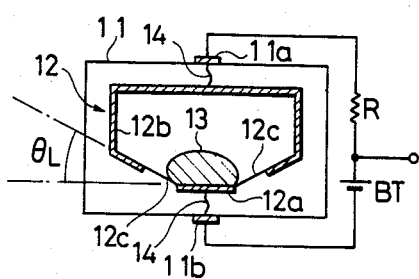
Figure 12B:
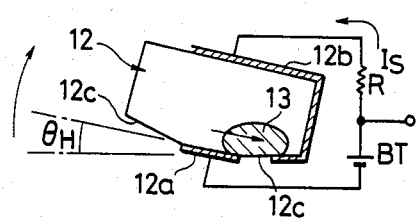
Figure 13B:
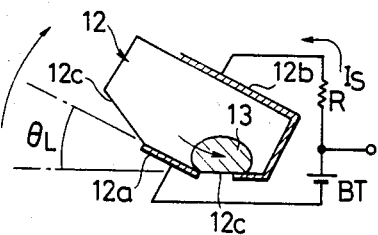
Figure 12C:
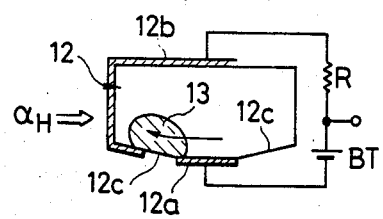
Figure 13C:
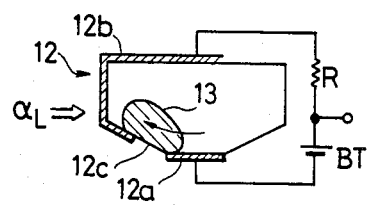

The foregoing description is concerned with an exemplary case of employing the sensor 101 shown in FIG. 2. However, it is to be understood that the sensors of FIGS. 12 and 13 may also be used. In the latter case, the portion enclosed with a dotted line in FIG. 1 can be replaced with each of the sensors of FIGS. 12 and 13.

As mentioned hereinabove, the motion sensor unit of the present invention comprises a sensor assembly for monitoring whether or not the inclination of a mobile member (e.g. vehicle body) is in excess of a predetermined reference angle and outputting a pulse signal in response to any excess of the inclination beyond the reference angle; a detector for monitoring whether or not the duration of the pulse signal is in excess of a predetermined reference time and, in response to any excess thereof beyond the reference time, outputting a signal representing that the inclination of the mobile member is greater than the reference angle and is continuous for more than the reference time; and an adjuster for adjusting the duration of the above predetermined time. Thus, it is rendered possible to achieve continuous control of the jolt detection sensitivity by adjusting such duration without affecting the inclination angle detection sensitivity. In the above structure, the sensor assembly consists of a sensor attached to a mobile member for outputting a pulse signal equivalent to the inclination thereof, and a detector for monitoring whether or not the output signal of the sensor is in excess of a predetermined reference level corresponding to the preset angle and outputting a pulse signal in response to any excess of the output signal beyond the reference level, wherein the inclination detection sensitivity can be controlled continuously through adjustment of the preset level.

According to another aspect of the invention, the motion sensor unit comprises a sensor assembly for outputting a pulse signal inverted in response to a shock given to a mobile member (e.g. vehicle body) and a detector for monitoring whether or not the cycle of the pulse signal is shorter than a predetermined reference time and outputting a shock detection signal in case the cycle is shorter than the reference time, and an adjuster for adjusting the duration of the reference time, wherein the shock detection sensitivity is controllable continuously and independently as well without altering the detection sensitivity for any jolt or inclination.

We claim:

1. A motion sensor unit for monitoring a mobile member such as a vehicle comprising:
    a sensor assembly for outputting an inclination pulse signal indicating an inclination angle of the mobile member and a shock pulse signal indicating a shock applied to the mobile member;
    a jolt detection circuit responsive to the output of an inclination pulse signal from said sensor assembly for detecting whether or not the duration of the inclination pulse signal exceeds a predetermined reference time and for outputting an inclination detection signal in response to such detection; and
    a shock detection circuit responsive to the output of a shock pulse signal from said sensor assembly for detecting whether or not the frequency cycle of the shock pulse signal exceeds a predetermined reference frequency and for outputting a shock detection signal in response to such detection.

2. A mobile sensor unit as claimed in claim 1, wherein said sensor assembly includes a housing mounted to the mobile member, a pendulum pivotably suspended by one end from an upper part of said housing and having a magnet disposed at its other, free end, a magnetic reluctance detector including a magnetic reluctance element disposed at a lower part of said housing below the free end of the pendulum for outputting a sensor signal in response to the detected motion of the free end of the pendulum upon an inclination of the mobile member and upon a shock applied to the mobile member, and a sensor circuit for outputting said inclination pulse signal and said shock pulse signal in response to said sensor signal.

3. A mobile sensor unit as claimed in claim 2, wherein said sensor assembly includes a circuit for adjusting a desired reference level signal indicating a predetermined reference level which is compared to said sensor signal, wherein said sensor circuit provides an output when said sensor signal exceeds said predetermined reference level.

4. A mobile sensor unit as claimed in claim 1, wherein said jolt detection circuit includes a circuit for adjusting a desired reference time signal to establish said predetermined reference time which is compared to the duration of said inclination pulse signal.

5. A mobile sensor unit as claimed in claim 1, wherein said shock detection circuit includes a circuit for adjusting a desired reference frequency signal to establish said predetermined reference frequency which is compared to the frequency cycle of said shock pulse signal.

* * * * *